March 22, 1960 J. R. WERTH 2,929,148
FIXTURE FOR CHECKING POSITIONS OF PORTIONS OF ARTICLES
Filed June 19, 1956 3 Sheets-Sheet 1
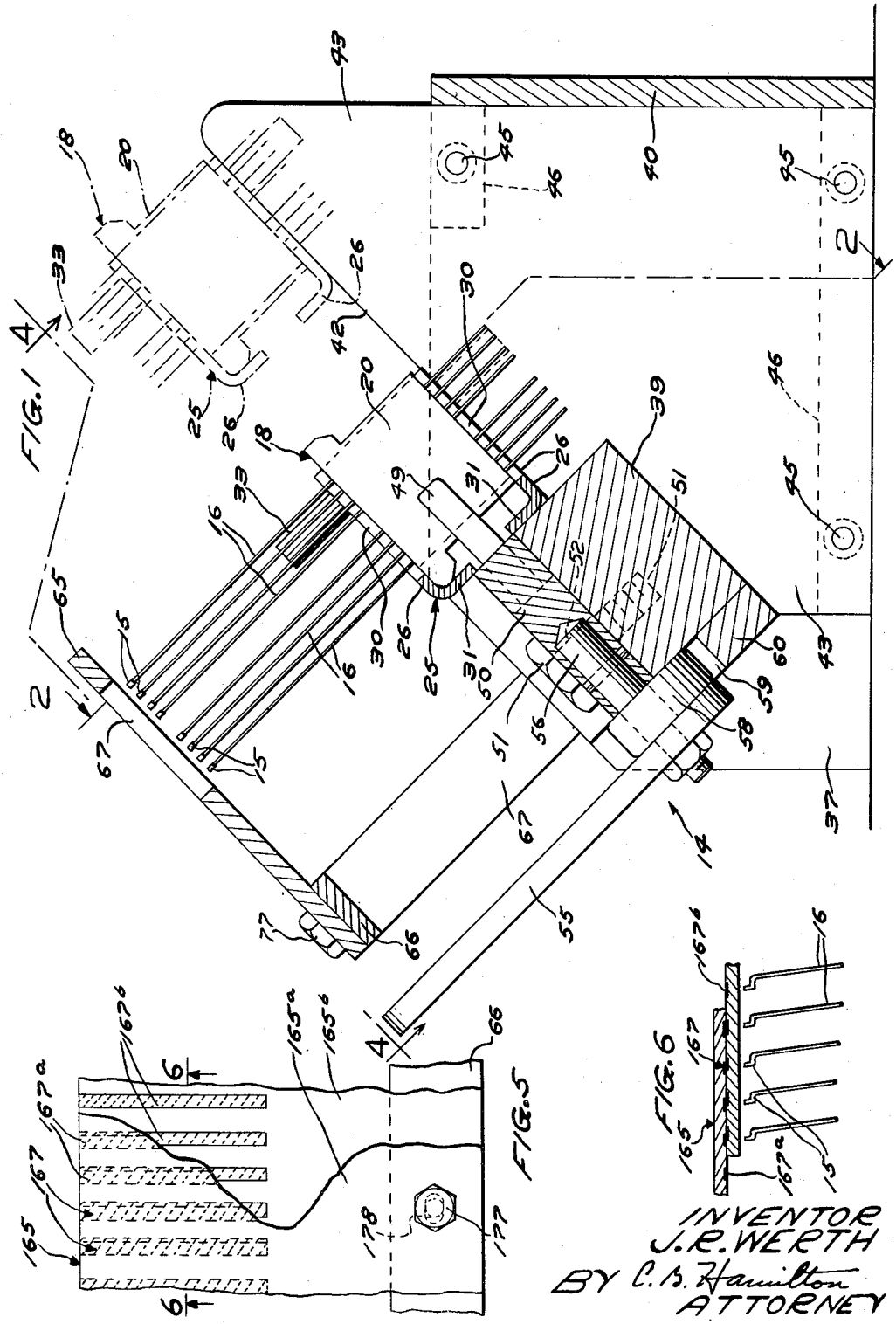
INVENTOR
J. R. WERTH
BY C. B. Hamilton
ATTORNEY

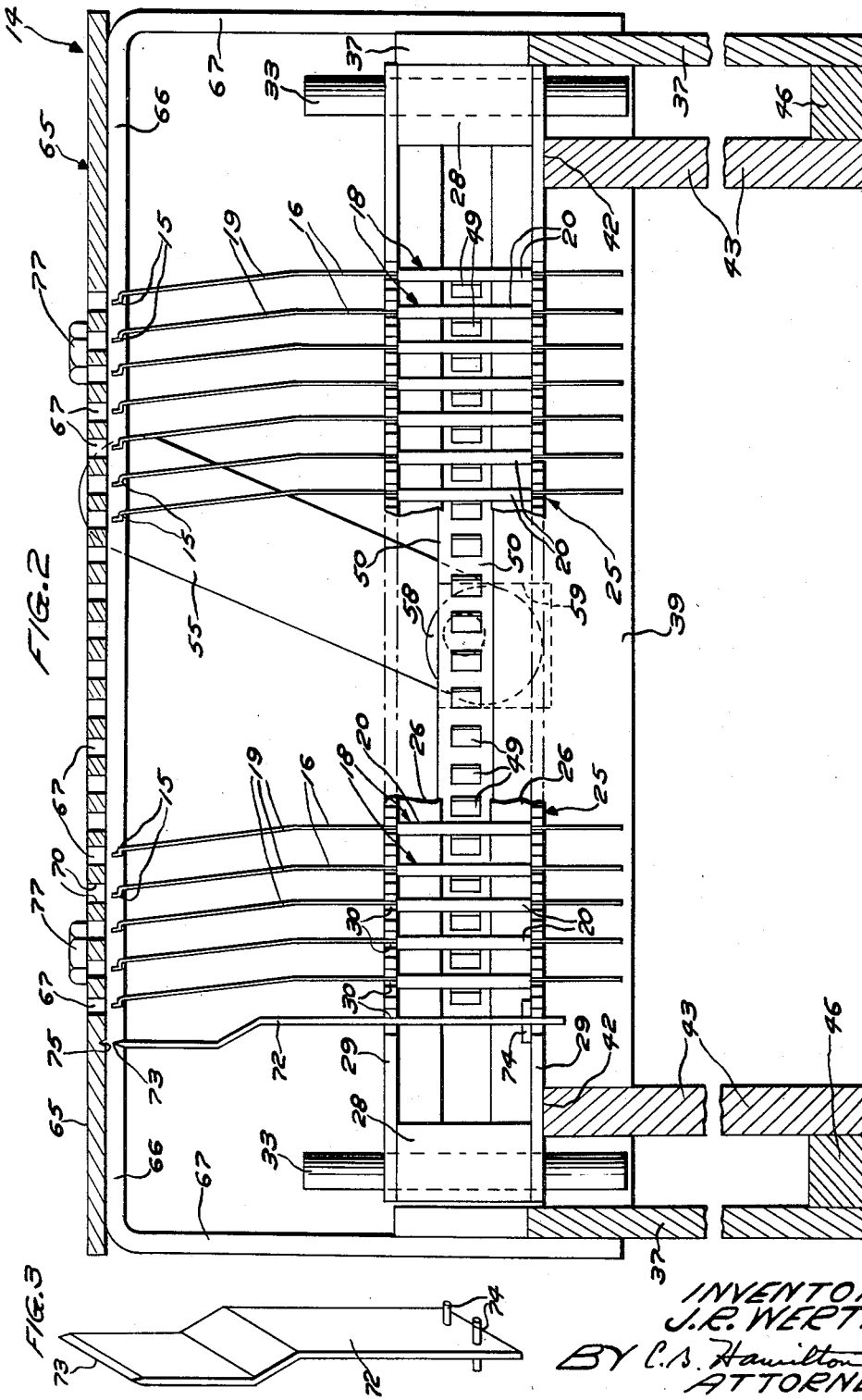

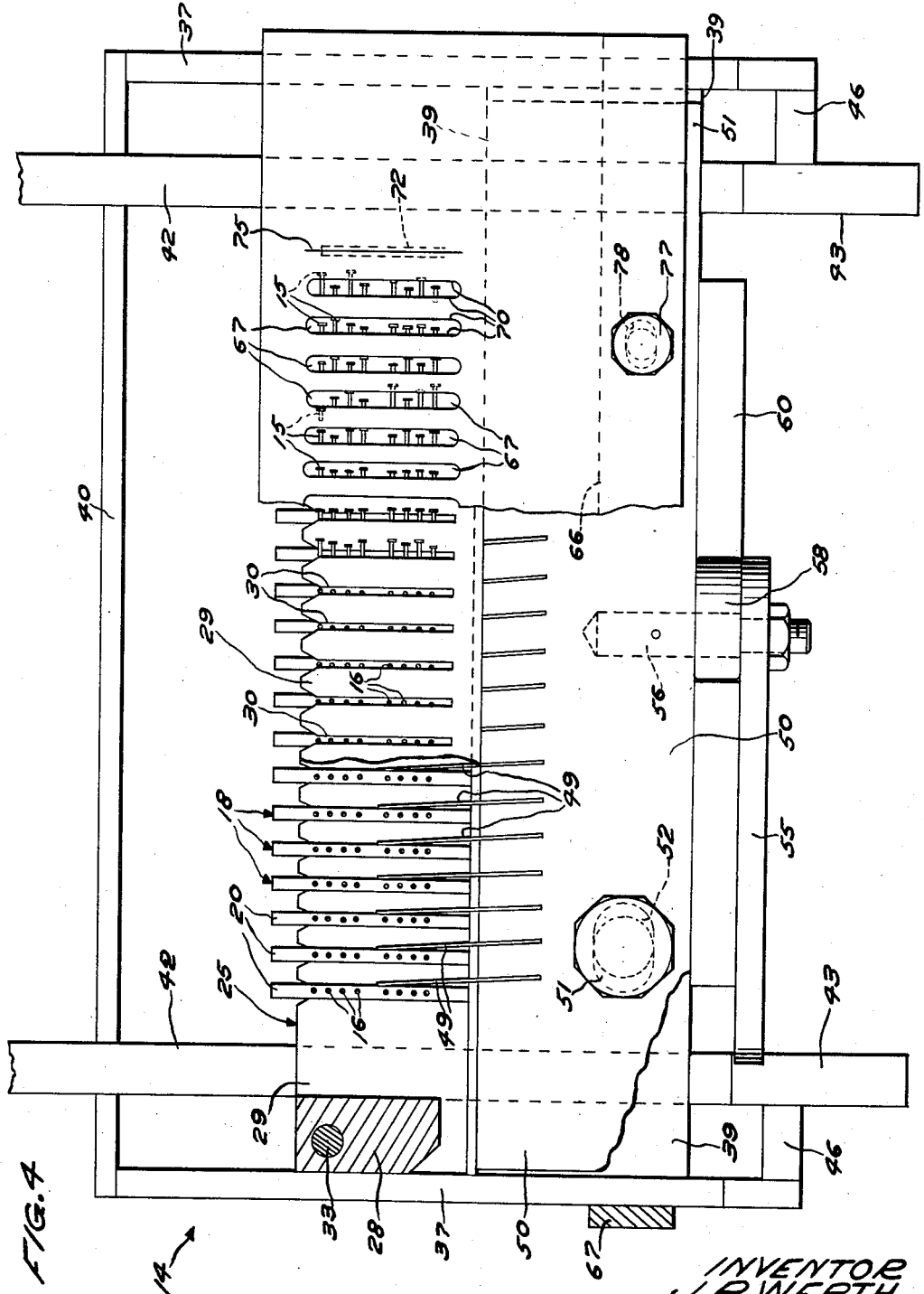

United States Patent Office 2,929,148
Patented Mar. 22, 1960

2,929,148
FIXTURE FOR CHECKING POSITIONS OF PORTIONS OF ARTICLES

Joseph R. Werth, Chicago, Ill., assignor to Western Electric Company, Incorporated, New York, N.Y., a corporation of New York Application June 19, 1956, Serial No. 592,465

10 Claims. (Cl. 33—174)

This invention relates to a fixture for checking articles, and more particularly to a device for supporting a plurality of relay parts having bent wire springs and for checking the position of the ends of these bent wire springs.

An object of the invention is to provide a fixture for supporting articles and checking the position of portions thereof.

Another object of the invention is to provide a device for supporting a plurality of articles and having a novel gage means for checking the position of portions of the articles.

A device illustrating certain features of the invention may include a frame for supporting a removable magazine in which relay parts are mounted in a row with bent wire springs thereof extending from the machine. The magazine is slid laterally on a pair of inclined rails into engagement with shoulders thereon to carry the relay parts between a plurality of leaf springs on a slide which is supported on the frame and is actuated to cause the leaf springs to seat the relay parts firmly in the magazine and to move the magazine longitudinally into a predetermined gaging position on the frame with the ends of the wires positioned below and in close proximity to a gage plate supported on the frame. The gage plate has a plurality of slots therein of a predetermined uniform width and in a predetermined relation to each of the relay parts in the magazine to define precise areas in which the ends of the wires must be positioned in order to meet the specification thereof whereby the operator may look through the slots to check the position of the ends of the wires to determine whether they come within the acceptable limits.

In another embodiment of the invention the gage plate has opaque gaging stripes thereon in predetermined relation to the relay parts in the magazine for masking the ends of the bent wires of the relay parts which are positioned within proper limits whereby the operator may inspect each set of wire ends through the gage plate, and if any of them are visible beyond the opaque strips associated therewith, it indicates that such relay parts do not meet the specification therefor without further adjustment.

Other objects and advantages of the invention will become apparent by reference to the following detailed description thereof, and the accompanying drawings, in which Fig. 1 is a vertical cross-sectional view of the device for checking articles showing the magazine and the articles therein in full lines in gaging position and showing in dotted lines a magazine in intermediate position;

Fig. 2 is a longitudinal sectional view through the device looking toward the front with portions thereof broken away and taken on line 2—2 of Fig. 1;

Fig. 3 is a perspective view of an aligning member insertable in the magazine;

Fig. 4 is an elevation view of the device looking perpendicular to the gage plate thereof with portions broken away and taken on the line 4—4 of Fig. 1;

Fig. 5 is a fragmentary face view of a modified embodiment of the gage plate, and Fig. 6 is a sectional view through the gage plate shown in Fig. 1 and taken on line 6—6 of Fig. 5.

The present device 14 is designed to facilitate the visual checking of the positions of the ends 15 of wire springs 16 (Fig. 2) of a relay part 18, after tension bends 19 have been made therein to determine if the ends of the bent portions of the wire have been uniformly offset within predetermined limits to provide substantially uniform tension in the wire springs when the relay parts 18 are assembled with other components of a composite relay. The wires 16 of a relay part are supported in a row in a block 20 of molded dielectric material.

A predetermined number of the relay parts 18 are supported in a row in uniformly spaced relation to each other in a magazine 25 which comprises a pair of elongated L-shaped members 26 secured in spaced relation to each other by a pair of spacers 28 at each end thereof. The parallel walls 29 of the members 26 are spaced apart to receive the blocks 20 therebetween and these walls are provided with a plurality of uniformly spaced slots 30 for receiving the wires 16 of the relay parts. The blocks 20 of the relay parts engage one of the flanges 31 of the L-shaped members 26, which flanges 31 are spaced apart to provide a longitudinal slot therebetween. Pins 33 at each end of the magazine form handles to facilitate handling the magazine.

The device 14 has a frame comprising a pair of spaced vertical substantially rectangular end plates 37 secured to the ends of a horizontal transverse frame member 39 and a back plate 40. The transverse frame member 39 is in the form of a rectangular block which is tilted at an angle in a front to back direction as shown in Fig. 1 and portions of the end frames are cut off at the same angle. Inclined guide rails 42 for supporting the magazine 25 are formed on the upper edges of a pair of vertically disposed plates 43 which are notched to receive the frame member 39 and which are secured to the end frames 37 by screws 45 and are spaced therefrom by spacers 46. A magazine 25 filled with relay parts 18 is placed on the upper end of the guide rails 42 with the pins 33 on the outside of the rails as shown in dotted lines in Fig. 1 and the magazine is moved downwardly into engagement with the frame member 39 which forms a stop therefor, and this movement of the magazine carries the relay parts 18 between a plurality of leaf springs 49 mounted on and extending laterally from a slide 50.

The slide 50 rests on the upper face of the transverse frame member 39 and is guided for limited reciprocable movement thereon by a pair of screws 51 which pass through slots 52 in the slide and are secured in the frame member 39. Means are provided for actuating the slide 50 which includes a handle 55 rotatably supported on a pivot pin 56 secured to the slide and extending laterally therefrom. The handle 55 has an eccentric cam 58 fastened thereto which rides in a slot 59 in a stationary plate 60 secured to the frame member 39 whereby in response to turning the handle 55 the slide 50 is actuated in one direction to cause the leaf springs to urge the relay parts to the left as viewed in Fig. 4 to press the wires 16 of the relay parts firmly against one side of the slots 30 in the magazine and to press the end of the magazine into engagement with the end wall 37 to a predetermined gaging position.

With the relay parts 18 in gaging position as shown in Figs. 1 and 2, the ends 15 of the wires 16 are disposed below and in close proximity to a gage plate 65 which extends across the device 14 and is supported on a U-shaped bracket 66, the downwardly bent arms 67 of which are secured to the end frame plates 37. The gage plate 65 is formed with a plurality of gaging areas, one for each set of wires of the relay parts 18 supported in the magazine 25, which areas define predetermined limits within which the ends 15 of the wire 16 of the relay parts must be positioned to render the relay parts acceptable.

In the preferred embodiment shown in Figs. 1–4, the gage plate 65 is made from a sheet of transparent plastic material such as Lucite or Plexiglas with the upper surface thereof sand blasted or otherwise roughened to render it translucent. The gage plate has a plurality of slots 67 which are arranged in a row in a predetermined spaced relation to each other corresponding to the spacing of the relay parts 18 in the magazine 25 and are positioned in predetermined relation to the relay parts 18 in the magazine to define areas or windows of limited width through which the operator may inspect the ends 15 of all of the wires 16 of relay parts 18 to check their positions. The side walls 70 of the slots 67 are spaced apart a predetermined distance to form limits between which the ends 16 of the wires must be positioned to meet the specifications for the relay part 18. The wire ends 15 which are positioned to either side of the slots 67 of the gage plate cannot be seen by the operator through the slots 67 but are visible through the translucent gage plate 65 and indicate that those relay parts on which such wires are mounted do not meet the standards set for them. The parallel side walls 70 of the slots 67 also serve as an aid to the operator in locating his point of vision during the checking of each relay part so as to permit him to view each set of wire ends 15 through the slot 67 associated therewith at an angle perpendicular to the gage plate 65.

In the magazines 25 slight variations in the distance between the gaging end thereof and the first slot 30 may occur and in such cases where variations do occur the relay parts 18 are disposed in different position relative to the slots 67 in the gage plate 65. Means are provided to adjust the gage plate 65 to compensate for slight variations in construction of the magazines 25 and obtain the same accurate relationship between the relay parts 18 and the slots 67 in the gage plates to permit accurate checking of the relay parts. For this purpose, an aligning member 72 is provided (Fig. 3) which comprises a flat metal strip having a sharp straight edge 73 formed on its upper end, which is offset with respect to the lower portion thereof a distance equal to the desired offset of the ends 15 of the bent portions of the wires 16 of the relay parts 18. The end relay 18 is removed from the magazine 25 and the aligning member 72 is inserted therein and a pair of pins 74 on the aligning member 72 engage a wall 29 of the magazine 25 to support the aligning member thereon in a predetermined position with the upper aligning edge 73 in close proximity to the gage plate 65. A straight reference line 75 is inscribed on the underneath side of the gage plate in a predetermined position for registration with the edge 73 of the aligning member 72 to indicate the proper alignment of the slots 67 in the gage plate with the relay parts 18 in the magazine. The gage plate 65 is adjustably secured to the supporting bracket 66 by a pair of screws 77 (Fig. 4) which pass through slots 78 in the gage plate and threadedly engage the bracket 66. Thus in the event that the reference line 75 of the gage plate 65 does not coincide with the edge 73 of the aligning member 72 in the magazine, the screws 78 may be loosened and the gage plate 65 moved longitudinally to effect the alignment of the reference line 75 and the aligning member 72 to establish the proper relationship between the relay parts 18 in the magazine 25 and the slots 67 in the gage plate 65 to permit the accurate checking of the positions of the wire ends 15 of the relay parts.

In the embodiment shown in Figs. 5 and 6, the gage plate 165 is a composite structure and is made of transparent material and has opaque stripes 167 corresponding to the slots 67 of the gage plate 65, and these opaque stripes 167 serve to indicate the limits or range of positions of the wire ends 15 of the relay parts which are acceptable. When using the gage 165 for checking, the ends 15 of the wires of acceptable relay parts are positioned under the opaque stripes 167 and are masked thereby so that during inspection of the relay parts when the wire ends 15 of the relay parts are seen through the transparent portions of the gage plate, such relay parts are unacceptable. The composite gage plate 165 comprises two sheets 165a and 165b of transparent material mounted in superposed relation to each other and secured to the U-shaped bracket 66 by screws 177 which pass through slots 178 in the sheets and engage the bracket 66. The sheets 165a and 165b have a plurality of parallel stripes 167a and 167b of opaque material in spaced relation to each other corresponding to the spacing of the relay parts 18 in the magazine and these stripes 167a and 167b are in overlapping relation to each other. The width of the opaque stripes 167 of the composite gage sheet may be varied to vary the gaging limits thereof by loosening the screws 177 and adjusting the sheets 165a and 165b relative to each other until the desired width of stripes is obtained after which the screws 177 are tightened to secure the strips to the bracket in adjusted position.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a fixture for inspecting and gaging the position of portions of articles, the combination of a magazine for supporting a plurality of articles in spaced relation to each other with the said portions of the articles extending therefrom, a frame for supporting the magazine and having movable means engageable with each article to position the articles and magazine therein in a predetermined position, a gage plate having a plurality of slots of a predetermined width in spaced relation to each other corresponding to the spacing of the articles in the magazine, and means on the frame for movably supporting the gage plate in close proximity to the said portions of the articles in the magazine and with the slots positioned by the movement of the gage plate in a predetermined alignment to the articles whereby the articles may be inspected through the slots to check the position of the said portions thereof.

2. In a fixture for inspecting and gaging the position of portions of articles, a frame, means on said frame for supporting a row of the articles in spaced relation to each other, a composite gage plate supported on said frame in close proximity to the said portions of the articles, said composite gage plate comprising a pair of adjustable superposed transparent sheets each having a row of transversely disposed opaque gaging stripes thereon in laterally spaced relation to each other corresponding to the spacing of the articles and with the stripes of one sheet in overlapping relation to the stripes on the other sheet, said sheets being adjustable relative to each other to vary the combined width of the overlapping opaque gaging stripes of the superposed sheets, and means for securing the sheets to each other in adjusted position with the gaging stripes of the composite gage plate in a predetermined relation to the articles to mask portions of the article whereby the articles may be inspected through the composite gage plate for checking the said portions of the articles.

3. In a fixture for inspecting and gaging the positions of portions of articles, the combination of a magazine for supporting a plurality of articles in spaced relation to each other with the said portions of the articles extending therefrom, a frame for supporting the magazine and the articles therein in a predetermined position, a gage plate supported on said frame in close proximity to the said portions of the articles and having a plurality of slots of predetermined width in spaced relation to each other corresponding to the spacing of the articles in the magazine, an aligning member on the magazine in a predetermined relation to the articles therein, a reference line on said gage member cooperable with said aligning member, and means for adjusting the gaging plate on the frame to effect the registration of the aligning member and the reference line to position the slots in a predetermined relation to the articles in the magazine for checking the positions of the said portions of the articles.

4. In a fixture for inspecting and gaging the positions of portions of articles, the combination of a magazine having a plurality of slots for supporting a row of articles in spaced relation to each other with the said portions extending therefrom, a slide having a plurality of leaf springs extending laterally therefrom, a frame for supporting said slide for movement in a predetermined direction and for supporting the magazine for lateral movement to a predetermined position with the articles between the leaf springs, means for actuating the slide to cause the leaf springs to seat the articles firmly in the slots in the magazine and to move the magazine longitudinally in said one direction into a predetermined gaging position on the frame, a gage plate mounted on the frame in close proximity to the said portions of the article in the magazine, said gage plate having a plurality of parallel slots of a predetermined width in spaced relation to each other corresponding to the spacing of the articles in the magazine and in a predetermined relation to said articles whereby the said portions of the articles may be observed through said slots for checking the position thereof.

5. In a fixture for inspecting and gaging the position of portions of articles, the combination of a magazine having a plurality of slots for supporting a row of articles in spaced relation to each other with the said portions extending therefrom, a slide having a plurality of leaf springs extending laterally therefrom, a frame for supporting said slide for movement in a predetermined direction and for supporting the magazine for lateral movement to a predetermined position to locate the articles between the springs on said slide, means for actuating the slide to cause the springs thereof to seat the articles firmly in the magazine and to move the magazine longitudinally in said one direction into a predetermined gaging position on the frame, a gage plate mounted on the frame in close proximity to the said portions of the articles in the magazine and having a plurality of parallel gaging slots of a predetermined width in spaced relation to each other corresponding to the spacing of the articles in the magazine and in a predetermined relation to said articles, an aligning element on the magazine in a predetermined relation to the articles therein, an aligning element on said gage plate, and means for adjusting the gaging plate on the frame to effect the registration of the aligning elements on the gage plate and on the magazine to position the gaging slots in a predetermined relation to the article in the magazine whereby the said portions of the articles may be inspected through said gaging slots to check the positions thereof.

6. In a fixture for inspecting and gaging the position of portions of articles, the combination of a magazine having a plurality of slots for supporting a row of articles in spaced relation to each other with the said portions extending therefrom, a slide having a plurality of leaf springs extending laterally therefrom, a frame for supporting said slide for movement in a predetermined direction and for supporting the magazine for lateral movement into engagement with the leaf springs on said slide, means for actuating the slide to cause the spring thereof to seat the articles in the magazine and to move the magazine longitudinally in said one direction into a predetermined gaging position on the frame, a transparent gage plate mounted on the frame in close proximity to the said portions of the article in the magazine and having a plurality of parallel opaque gaging stripes of a predetermined width in spaced relation to each other corresponding to the spacing of the articles in the magazine and in a predetermined relation to said articles whereby said portions of the article may be inspected through said gage plate for checking the positions of the said portions of the articles.

7. In a fixture for inspecting and gaging the position of portions of articles, the combination of a magazine for supporting a plurality of articles in spaced relation to each other with the said portions of the articles extending therefrom, a frame for supporting the magazine and the articles therein in a predetermined position, a transparent gage plate supported on said frame in close proximity to the end of the said portions of said articles and having a plurality of opaque stripes of predetermined width in spaced relation to each other corresponding to the spacing of the articles in the magazine, an aligning element on the magazine in a predetermined relation to the articles therein, an aligning element on said gage plate, and means for adjusting the gaging plate on the frame to effect the registration of the aligning elements to position the stripes on the gage plate in a predetermined relation to the articles in the magazine to mask the said portions of properly formed articles whereby the articles may be inspected through the gage plate to check the positions of the said portions thereof.

8. In a fixture for inspecting the positions of portions of articles, the combination of a magazine for supporting a plurality of articles in spaced relation to each other with the said portions of the articles extending therefrom, a frame for movably supporting the magazine and the articles therein in a predetermined position, a gage plate supported on said frame in close proximity to the said portions of the articles and having a plurality of parallel masking portions of predetermined width arranged in a row in spaced relation to each other corresponding to the spacing of the articles in the magazine to define areas therebetween of predetermined width through which the said portions of the articles may be seen to check the positions thereof, an aligning member on the magazine in a predetermined relation to the articles therein, a reference line on said gage member cooperable with said aligning member, and means for adjusting the gaging plate on the frame to effect the registration of the aligning member and the reference line to position the masking portions of the gaging plate in a predetermined relation to the articles in the magazine.

9. In a fixture for inspecting the positions of the end portions of contact springs on electrical components, the combination of a magazine having a plurality of slots for supporting a row of the electrical components in spaced relation to each other, a slide having a plurality of leaf springs extending laterally therefrom, a frame for supporting said slide for movement in a predetermined direction and for supporting the magazine for lateral movement to a predetermined position with the electrical components between the leaf springs, means for actuating the slide to cause the leaf springs to seat the electrical components firmly in the slots in the magazine and to move the magazine longitudinally in said one direction into a predetermined gaging position on the frame, a gage plate mounted on the frame in close proximity to the end portions of the contact springs on the electrical components in the magazine, said gage plate having a plurality of parallel masking portions of a predetermined width arranged in a row in spaced relation to each other corresponding to the spacing of the electrical components in the magazine to define areas therebetween of predetermined width through which portions of the contact springs may be observed for checking the position thereof.

10. In a fixture for inspecting and checking the position of contact springs of electrical components, a magazine for supporting a row of components in a predetermined spaced relationship, a frame for movably supporting said magazine, a gage plate adjustably mounted on said frame and having a plurality of uniform transparent areas spaced relative to the spacing of the components within the magazine, means on said frame for engaging each component to move and secure the magazine and components into a predetermined inspecting position, indicating means on said magazine, indicating means on said gage plate, and means for adjusting the position of the gage plate to move the gage plate indicating means into alignment with the magazine indicating means whereby the position of the contact springs may be checked relative to the transparent areas of the gage plate.

References Cited in the file of this patent

UNITED STATES PATENTS

| | | |
|---|---|---|
| D. 94,464 | Bausch | Feb. 5, 1935 |
| 1,427,586 | D'Olier | Aug. 29, 1922 |
| 2,002,679 | Schoof | May 28, 1935 |
| 2,009,968 | Gastrich | July 30, 1935 |
| 2,054,697 | Fiala | Sept. 15, 1936 |
| 2,073,832 | Dalkowitz | Mar. 16, 1937 |
| 2,270,158 | Baesgen | Jan. 13, 1942 |
| 2,376,811 | Rigby | May 22, 1945 |
| 2,812,585 | Broughton | Nov. 12, 1957 |

FOREIGN PATENTS

| | | |
|---|---|---|
| 562,692 | Great Britain | July 12, 1944 |
| 693,023 | Great Britain | June 17, 1953 |